(12) United States Patent
Hilpert

(10) Patent No.: US 11,821,488 B2
(45) Date of Patent: Nov. 21, 2023

(54) DEVICE AND METHOD FOR NOISE REDUCTION OF A LINEAR DAMPER

(71) Applicant: ILLINOIS TOOL WORKS INC., Glenview, IL (US)

(72) Inventor: Jürgen Hilpert, Reidenheim (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 55 days.

(21) Appl. No.: 17/355,316

(22) Filed: Jun. 23, 2021

(65) Prior Publication Data

US 2022/0003293 A1 Jan. 6, 2022

(30) Foreign Application Priority Data

Jul. 2, 2020 (DE) .................. 10 2020 117 520.5

(51) Int. Cl.
| | |
|---|---|
| *F16F 9/32* | (2006.01) |
| *F16F 9/12* | (2006.01) |
| *B29C 45/16* | (2006.01) |
| *E05F 3/14* | (2006.01) |
| *B29L 31/00* | (2006.01) |

(52) U.S. Cl.
CPC ........ *F16F 9/3207* (2013.01); *B29C 45/1676* (2013.01); *B29L 2031/721* (2013.01); *E05F 3/14* (2013.01); *E05Y 2201/10* (2013.01); *E05Y 2201/254* (2013.01); *E05Y 2201/266* (2013.01); *E05Y 2900/538* (2013.01); *F16F 9/12* (2013.01); *F16F 2222/12* (2013.01); *F16F 2224/025* (2013.01); *F16F 2226/04* (2013.01); *F16F 2232/06* (2013.01)

(58) Field of Classification Search
CPC ........ F16F 9/3207; F16F 9/12; F16F 2222/12; F16F 2224/025; F16F 2226/04; F16F 2232/06; B29C 45/1676; B29L 2031/721; E05F 3/14; E05Y 2201/25; E05Y 2201/266; E05Y 2900/538
See application file for complete search history.

(56) References Cited

U.S. PATENT DOCUMENTS

| | | | | |
|---|---|---|---|---|
| 4,614,004 | A | | 9/1986 | Oshida |
| 4,784,285 | A | * | 11/1988 | Patel ..................... B62D 25/24 220/782 |
| 4,885,121 | A | * | 12/1989 | Patel ..................... B62D 25/24 425/134 |
| 4,908,905 | A | * | 3/1990 | Kanno ..................... F16F 9/12 188/290 |

(Continued)

FOREIGN PATENT DOCUMENTS

| | | |
|---|---|---|
| DE | 102006000950 B4 | 8/2007 |
| DE | 102017128977 A1 | 6/2019 |

(Continued)

*Primary Examiner* — Robert A. Siconolfi
*Assistant Examiner* — James K Hsiao
(74) *Attorney, Agent, or Firm* — THOMPSON HINE LLP

(57) ABSTRACT

During the transition from the opening to the closing movement of a glove compartment door, or vice versa, undesirable noises ("clicking"/"popping") can be reduced by providing regions of a housing surrounding a rotation damper with a contact region made of a material having a lower modulus of elasticity than the material of the remainder of the housing.

8 Claims, 4 Drawing Sheets

(56) References Cited

U.S. PATENT DOCUMENTS

| | | | | |
|---|---|---|---|---|
| 5,211,267 | A * | 5/1993 | Clark | F16F 9/52 188/290 |
| 5,381,877 | A * | 1/1995 | Kobayashi | F16F 9/12 188/293 |
| 5,540,420 | A * | 7/1996 | Luzsicza | F16F 1/38 267/141.1 |
| 6,161,255 | A * | 12/2000 | Garrett | A47K 3/36 16/382 |
| 7,032,985 | B1 | 4/2006 | Ichioka | |
| 8,079,450 | B2 * | 12/2011 | Zeilenga | F16F 9/12 188/82.1 |
| 8,925,696 | B2 * | 1/2015 | Zeilenga | F16F 1/10 312/319.1 |
| 9,107,561 | B2 * | 8/2015 | Lundberg | A47L 15/4259 |
| 9,261,158 | B2 * | 2/2016 | Doornbos | F16F 9/12 |
| 9,297,195 | B2 * | 3/2016 | Berry, Jr | F16F 9/12 |
| 9,989,119 | B2 * | 6/2018 | Oberender | F16F 9/0218 |
| 11,458,661 | B2 * | 10/2022 | Bland | B29C 45/14786 |
| 2004/0103746 | A1 * | 6/2004 | Anton | B29C 66/30223 16/221 |
| 2007/0108000 | A1 * | 5/2007 | Derr | E05D 11/084 188/290 |
| 2009/0115115 | A1 | 5/2009 | Zeilenga | |
| 2012/0174339 | A1 * | 7/2012 | Novin | E05D 11/1078 16/334 |
| 2012/0311817 | A1 * | 12/2012 | Bacchetti | E05F 3/20 16/49 |
| 2015/0275997 | A1 * | 10/2015 | Burton | F16F 1/187 267/166 |
| 2016/0017648 | A1 * | 1/2016 | Petrelli | E05F 1/1223 16/284 |
| 2016/0018780 | A1 * | 1/2016 | Sugiyama | G03G 21/1633 188/290 |
| 2017/0030125 | A1 * | 2/2017 | Bacchetti | E05F 3/10 |
| 2019/0170204 | A1 | 6/2019 | Fuchs | |
| 2019/0203515 | A1 * | 7/2019 | Benedetti | E05D 3/02 |
| 2020/0317138 | A1 * | 10/2020 | Jinbo | B60R 7/06 |
| 2021/0002939 | A1 * | 1/2021 | Lindsey | F16F 15/067 |
| 2021/0220101 | A1 * | 7/2021 | Jungnickel | B29C 45/1676 |

FOREIGN PATENT DOCUMENTS

| | | |
|---|---|---|
| EP | 0846886 B1 | 6/1998 |
| EP | 1344958 B1 | 4/2007 |
| WO | WO 9600858 A1 | 1/1996 |

* cited by examiner

DEVICE AND METHOD FOR NOISE REDUCTION OF A LINEAR DAMPER

TECHNICAL FIELD

An apparatus for reducing noise in a housing of a linear damper and a method for providing such an apparatus will be discussed.

BACKGROUND

Linear dampers comprising a rotation damper—are used to slow or dampen movements of parts such as glove compartment doors or movable flaps. Such linear dampers with rotation dampers comprised therein are described in the patent specifications EP 0 846 886 B1, EP 1 344 958 B1 and DE 10 2006 000 950 B4, for example. Conventional rotation dampers include a rotor which is rotatably mounted inside the rotation damper. A brake fluid, e.g. silicone oil, between the rotor and the outer wall of the rotation damper provides braking damping when the rotor rotates in the rotation damper. A pinion is typically seated on the rotor shaft and meshes with a tooth segment that is part of a rack, for example. Such a rotation damper is often attached to a stationary part of the housing. A linear guide is furthermore provided for the rack and is mounted such that it can pivot about the axis of the rotor shaft and holds the rack in engagement with the pinion, regardless of the rotational position of the rack. The guide enables a translatory movement of the rack in the guide and thus causes a corresponding rotation of the pinion. Any pivoting of the rack is absorbed by the rotating guide. Any movement of the component to be damped therefore results in linear movement in the guide and a corresponding damping by the rotation damper. Precise guidance of the rack prevents noises, ensures effective engagement with the damper, and reduces potential wear.

Since the rotation damper can rotate in the housing of the guide, its entire outer periphery is provided with a structure via which engagement with the surrounding housing of the guide is made possible. The outer periphery of the rotation damper is typically embodied as a spur gear. A corresponding receiving structure, which typically does not extend over the entire inner periphery of the housing, is implemented on the inner side of the housing surrounding the rotation damper. Often, only two or four teeth are provided. These teeth are disposed at a location in which the rotation damper abuts the housing during movement of the pinion on the rack. The teeth of the rotation damper thus come into engagement with the toothed portion on the inner peripheral side of the housing of the guide.

If the direction of movement of the housing part to be damped is reversed, for example when an opened glove compartment door is closed, the rotation damper lifts away from the inner wall of the housing as a result of the linear movement of the rotation damper of about 1 mm that occurs when the direction is changed, and then hits the opposite side of the inner wall of the housing again. This causes a brief noise ("click"/"pop" or "clack") when the direction of the structural element to be damped changes.

It is also possible that a noise occurs during movement in the direction of damping as well. If, for example, a glove compartment door is opened (the damper is still in freewheeling position), or if the door is stopped and lifted slightly during the opening movement, i.e. in the direction of damping, the rotation damper transitions into a freewheeling state in which the teeth are not engaged. This is due to the fact that the damper is initially lifted away from the housing during the counter-movement. When the opening movement is then resumed, the teeth of the rotation damper reengage with the teeth in the toothed portion on the inner peripheral surface of the housing of the guide. This may cause the tips of the teeth of the housing and the teeth of the rotation damper to come into contact prior to reengaging. This movement also produces a brief noise ("clicking" or "clacking"). Such a noise is perceived as annoying and useless. The movement sequence can also seem jerky, which is likewise perceived as unpleasant.

SUMMARY

In light of this, one object of the present invention is to improve a linear damper in terms of noise development and a smoother movement sequence.

A further object is to provide methods for producing improved housings of a linear damper.

Accordingly, a housing of a linear damper is provided, which forms a guide for a rotation damper and is provided with at least one engagement element, the longitudinal extension of which extends parallel to an axial direction of a rotational movement of the rotation damper, wherein the rotation damper is provided with an outer structure which forms a counter engagement element that is configured to correspond to the engagement element, and wherein a contact region of at least one engagement element, in which the counter engagement element of the rotation damper is in contact with the engagement element of the housing during movement in a direction of movement, is made of a material having a lower modulus of elasticity than the housing.

With such a housing of a linear damper, the development of noises upon reversal or resumption of movement can be reduced by providing a contact region made of a material having a lower modulus of elasticity than the surrounding housing. During the opening movement of the moving element, e.g. a glove compartment door, the rotation damper is in engagement with the housing. When the movement of the glove compartment door is stopped or reversed, the rotation damper moves away from the side of the housing which said rotation damper abuts. The rotation damper thus enters a state in which it is in a freewheeling position relative to the housing in the direction of movement. Then, when the movement is resumed, the rotation damper again comes into contact with the segments of the housing. To eliminate clicking noises that are perceived as annoying, the contact regions, in which the segments of the housing come into contact with the rotation damper, are made of a material that has a lower modulus of elasticity than the housing. Consequently, these contact regions are softer than the remainder of the housing. This dampens noises and also results in a less jerky movement sequence. Moreover, the compressive load for the parts of the housing covered by the contact region is distributed evenly.

Both the engagement element and the counter engagement element can have a structure configured for form-fitting interengagement, whereby the structures are configured in the form of a toothing, for example.

In the context of the present invention, all suitable profiles or toothings are considered to be structures for form-fitting interengagement. They can be rectangular, wave-shaped, trapezoidal, or triangular.

In one embodiment, a housing is provided, wherein at least one tooth is used as the engagement elements.

If as few structural elements as possible, e.g. teeth, come into contact with the rotation damper, the structure of the housing can be simplified and consequently the production of the housing can be simplified.

In a further embodiment, a housing is provided wherein a thickness of the contact region is selected such that the rotation damper is still in secure engagement with the housing when the material having a lower modulus of elasticity than the housing, and is less abrasion-resistant than the material of the remainder of the housing, is worn down.

It is thus possible to ensure that a long service life can be achieved despite the use of a material having a lower modulus of elasticity than the material of the remainder of the housing.

In this embodiment, the thickness or covering of the contact region is about 0.1 mm or 0.15 mm or 0.3 mm to 0.4 mm or 0.6 mm, preferably 0.2 mm to 0.5 mm.

This covering makes it possible to achieve a good service life and also good damping of the noises.

In a further embodiment, a housing is provided wherein the contact region is disposed in a recess of the housing and the dimensions of the recess do not exceed the dimensions of the contact region.

In a further embodiment, a housing is provided wherein the housing is formed from at least one first component and the contact region is formed from at least one second component having a lower modulus of elasticity than the at least one first component which forms the remainder of the housing in a multicomponent injection molding process.

The use of a multicomponent injection molding process simplifies the production of the housing with a contact region having a lower modulus of elasticity than the remainder of the housing and reduces the number of necessary production steps.

In a further embodiment, a housing is provided wherein the contact region is disposed on a flank.

Disposing the contact region on a flank, e.g. of a tooth or a widening of the housing, reduces the consumption of material having a lower modulus of elasticity than the material of the remainder of the housing. The term flank is understood here to mean that the thus designated surface has an angle with the inner peripheral surface of the housing. Such flanks are the flanks of trapezoidal or triangular teeth, for example, or the transition region between two inner peripheral surfaces of the housing having different radii.

In a further embodiment, a housing is provided wherein the contact region is disposed on an inner peripheral surface of the housing.

If an inner peripheral surface of the housing has a contact region made of a material having a lower modulus of elasticity than the remainder of the housing, noises that occur when the rotation damper comes into contact with the housing can be prevented even more reliably.

In a further embodiment, a housing is provided wherein the contact region is disposed on a portion of an inner peripheral surface of the housing and/or a portion of a flank.

In a further embodiment, a housing is provided wherein the contact region covers three quarters or half or a quarter of the inner peripheral surface of the housing and/or the flank in axial direction.

In a further embodiment, a housing is provided wherein the material having a lower modulus of elasticity than the housing is a thermoplastic elastomer (TPE).

Using a thermoplastic elastomer as the material having a lower modulus of elasticity than the material of the remainder of the housing makes it possible to achieve particularly high noise reduction.

The housing is made of a material such as polyethylene (PE), polypropylene (PP) or polyamide (PA) that has good adhesive properties for the TPE.

A method for producing a housing which surrounds a rotation damper is provided by including a part provided with a contact region, whereby the rotation damper is in contact with the housing at the contact region, whereby the contact region of the part is made of a material having a lower modulus of elasticity than the housing.

A method for producing a housing which surrounds a rotation damper is further provided by molding a contact region onto an already preformed remainder of the housing, whereby the rotation damper is in contact with the housing at the contact region and whereby the contact region is made of a material having a lower modulus of elasticity than the remainder of the housing.

A further method for producing a housing which surrounds a rotation damper by means of a multicomponent injection molding process is carried out by injection molding at least one component to create a housing, and by injection molding at least one further component to create a contact region in which the rotation damper is in contact with the housing, whereby the at least one further component is made of a material having a lower modulus of elasticity than the material of the remainder of the housing.

According to these aforementioned methods, a housing for a rotation damper having the additional function of noise reduction can be produced in a particularly simple manner, i.e. in a few production steps.

Any of the aforementioned methods can be improved if the material having a lower modulus of elasticity than the housing is a thermoplastic elastomer.

Using a thermoplastic elastomer as the material having a lower modulus of elasticity than the material of the remainder of the housing in one of the aforementioned methods makes it possible to achieve particularly high noise reduction.

BRIEF DESCRIPTION OF THE DRAWINGS

The apparatus and the method are illustrated in detail in the following with reference to the figures.

DETAILED DESCRIPTION

Figure 1:
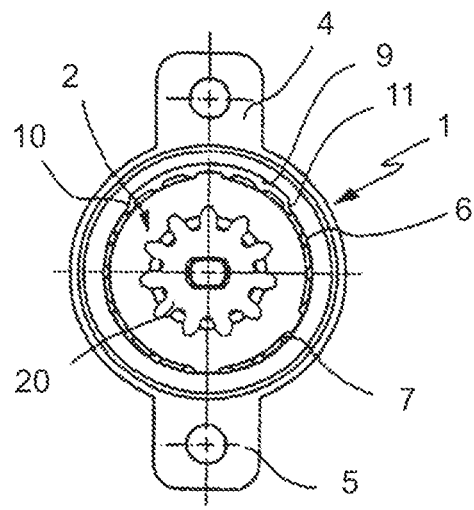
FIG. 1 shows a housing of a linear damper, which comprises a rotation damper and has two abutment surfaces and a toothed damper insert.
Figure 2:
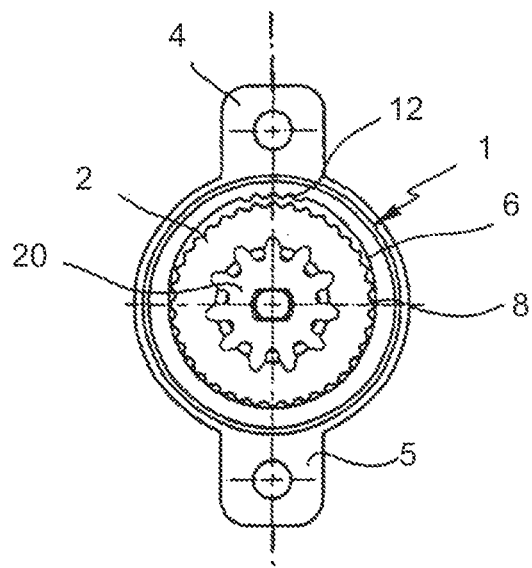
FIG. 2 shows a housing of a linear damper, which comprises a rotation damper and has an inner row of teeth for engagement with a toothed damper insert.

FIG. 1 and FIG. 2 show two rotation dampers 2 and respective housings 1 of dampers. The rotation dampers 2 are accommodated in these housings 1 in inner chambers 6. The housings 1 provide precise lateral guidance for the rotation damper. The housings 1 can be connected to other not depicted structural elements via flanges 4 and 5. The rotation damper 2 and the housing 1 are connected to a not depicted rack via a pinion 20. The rack or flange are used for connection to a further structural element such as a glove compartment door or for connection to the remainder of the structure, which, for example in the case of a glove compartment door, can be the remainder of the dashboard. Since the housings 1 form a precise guide for the rotation dampers 2, the precise engagement of the pinion 20 connected to the rotation damper in the rack is ensured.

The rotation dampers 2 in FIG. 1 and FIG. 2 are toothed. Whereas the individual teeth in FIG. 1 are separated by grooves 7, i.e. groove-shaped depressions, and have a trapezoidal cross-section, in FIG. 2 the rotation damper is provided with an external toothing 8 in which the individual teeth have a triangular cross-section. In FIG. 1, the housing 1 has a widening 9, i.e. a region in which the radius of curvature of the inner peripheral surface of the housing 1 is greater than the radius of curvature of the inner peripheral surface of the remainder of the housing. At the transition of this region 9 to the remainder of the inner peripheral surface of the housing, the flanks (engaging flanks) 10 and 11 form engagement regions in which the teeth having the trapezoidal cross-section of the rotation damper 2 can engage.

In FIG. 2, the toothing 8 on the rotation damper 2 is embodied with teeth having a triangular cross-section. A toothed portion 12 is correspondingly provided on the inner peripheral surface of the housing 1. This toothed portion 12 comprises at least one tooth, but, as shown in the following figures, two teeth are preferred. It is also possible to use four teeth for the toothed portion 12, as shown in FIG. 2.

In FIG. 1 and FIG. 2, the direction of movement is from top to bottom. If the rotation damper and the housing are used for a glove compartment door, for example, the rotation damper 2 abuts the widening 9 or the toothed portion 12 when the glove compartment door is opened. When the glove compartment door is closed, as shown in FIG. 1 and FIG. 2, the rotation damper 2 abuts the segment of the lower inner peripheral surface of the housing opposite to the widening 9 or the toothed portion 12. Another possible operating state occurs when the direction of movement is reversed. After the glove compartment door has been opened completely or partially, the rotation damper 2 still abuts the widening 9 or the toothed portion 12. At the beginning of the movement in the other direction, i.e. in closing direction of the glove compartment door, the rotation damper 2 lifts away from the widening 9 or the toothed portion 12 without already abutting the segment of the inner peripheral surface of the housing which, in the figures, is lower. The rotation damper 2 is thus freely rotatable in the housing 1. This state is consequently referred to as freewheeling.

Figure 3:
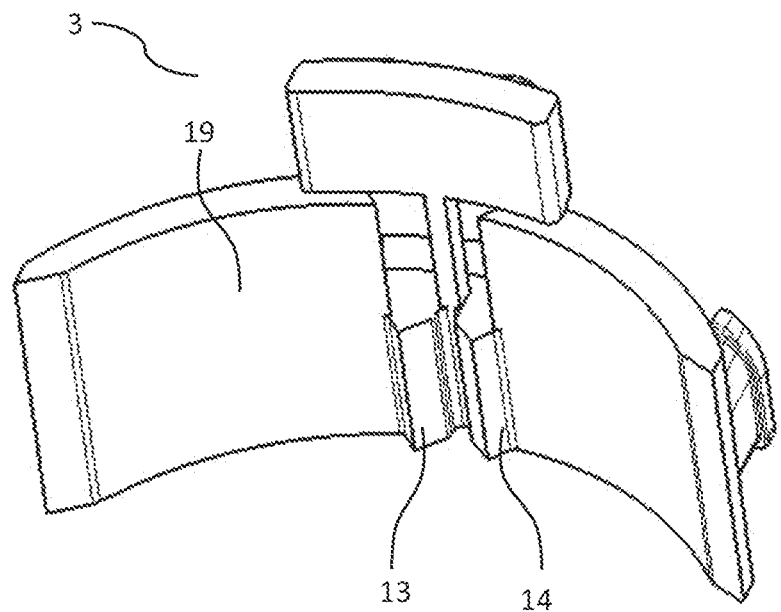
FIG. 3 shows a part for insertion into the housing, which has a contact region made of a material having a lower modulus of elasticity than the housing.
Figure 4:
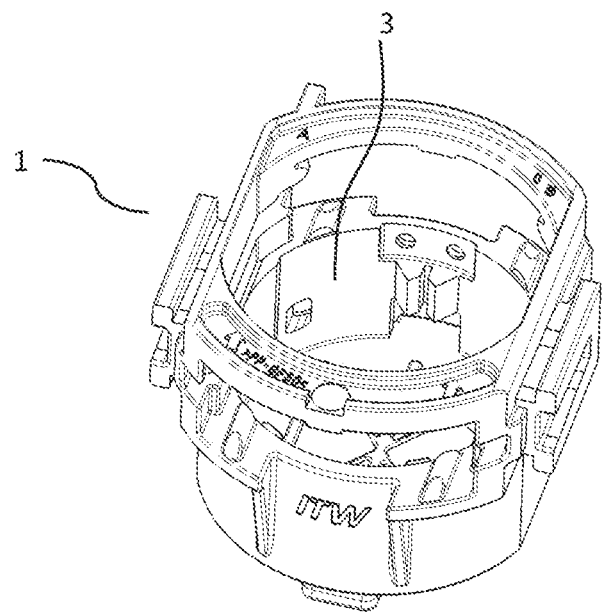
FIG. 4 shows a housing, in which all of the surfaces of the flanks of the teeth have been provided with a material having a lower modulus of elasticity than the housing.

FIG. 3 shows an embodiment of the housing 1, in which the inner peripheral surface 19 of a part 3 or an insert element 3 is coated with a material having a lower modulus of elasticity than the material of the remainder of the housing. The inner peripheral surface 19 of said housing part 3 thus has the desired property of noise reduction. A circular segment-like support element 21 is furthermore provided in the region of the teeth. This support element 21 is optional and is in particular provided to support the rotation damper 2 and prevent it from tilting. The inner peripheral surface 19 can also be configured to support the rotation damper 2 and prevent it from tilting. To achieve sufficient stability, the teeth 13, 14, and also the surface of the housing part 3 facing away from the rotation damper have to be made of the same material as the remainder of the housing. The teeth 13, 14 are therefore likewise coated with the same material with which the inner peripheral surface is coated. As a result, the entire surface of the contact region consists of a material having a lower modulus of elasticity than the material of the remainder of the housing. The term contact region is understood here to be a region of the inner peripheral surface in which the rotation damper 2 of FIG. 1 or 2 can be in contact with the housing 1 during movement of the glove compartment door.

Figure 5:
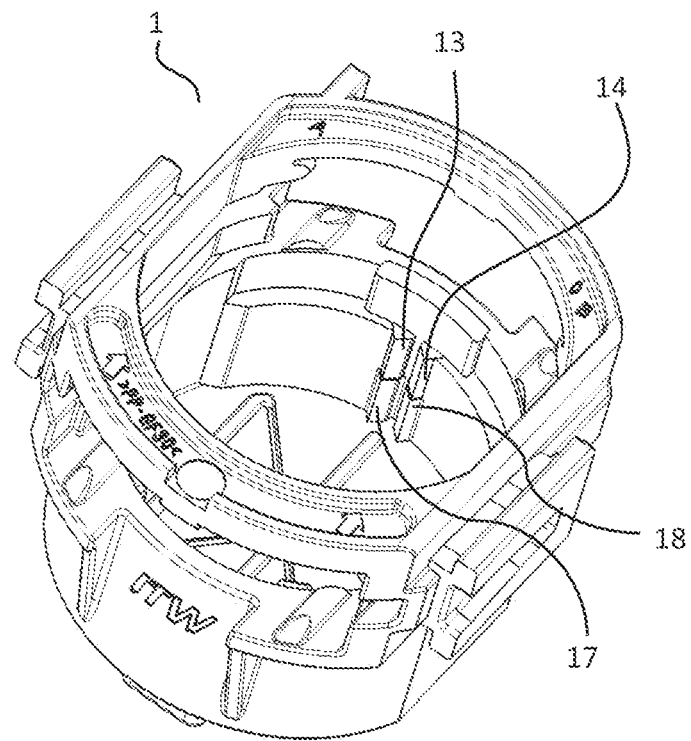
FIG. 5 shows a housing, in which half of the surfaces of the flanks of the teeth have been provided with a material having a lower modulus of elasticity than the housing.

FIG. 5 shows how the insert 3 shown in FIG. 3 is inserted into a housing 1 and can effect noise reduction.

Figure 6:
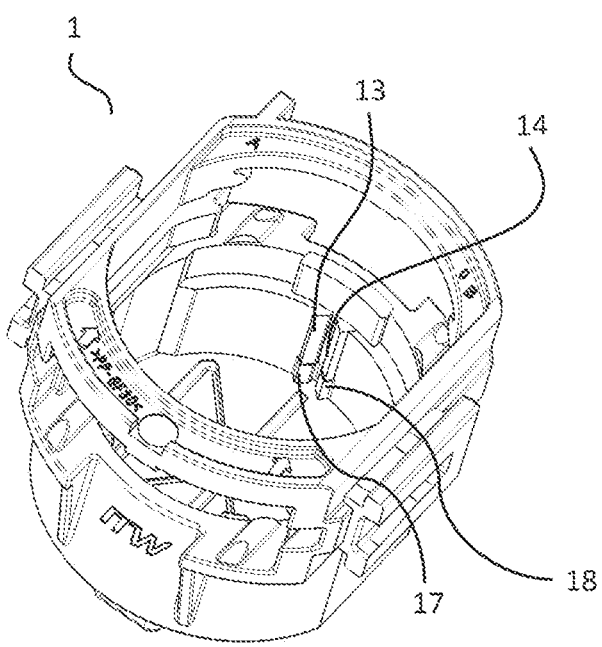
FIG. 6 shows a housing, in which half of the surfaces of the flanks of the teeth have been provided with a material having a lower modulus of elasticity than the housing.
Figure 7:
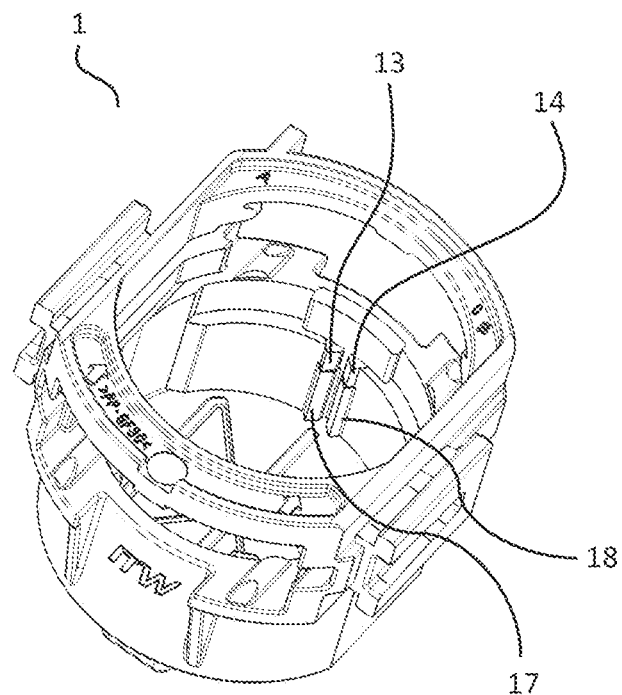
FIG. 7 shows a housing, in which three-quarters of the surfaces of the flanks of the teeth have been provided with a material having a lower modulus of elasticity than the housing.

FIGS. 5-7 show further embodiments of the housing 1 in which only portions of the teeth 13 and 14 are provided with contact regions 17 and 18. Even if not all of the inner peripheral surface of the housing 1 is provided with contact regions made of a material having a lower modulus of elasticity than the material of the remainder of the housing, good noise reduction can nonetheless be achieved while at the same time saving material having a lower modulus of elasticity than the material of the remainder of the housing. It goes without saying that the contact regions 17 and 18 do not have to be disposed at the end of the teeth 13 and 14 which in the FIG. is on the bottom, but can also be located at the center of the axial extent of the teeth 13 and 14 or at their upper end. The dividing line between the contact region 17 or 18 also does not necessarily have to extend in the peripheral direction of the inner surface of the housing. It can also extend in axial or a different direction.

The not-to-scale FIG. 5-7 show that the contact regions represent a thickening of the teeth. If the covering of the material of the contact regions is preferably 0.2 mm, the material having the lower modulus of elasticity projects, e.g. 0.2 mm, beyond the regions of the tooth flanks that are not provided with a contact region. The flanks of the teeth in the non-visible region below the contact region are accordingly provided with 0.2 mm deep recesses into which the material for the contact regions is inserted.

FIG. 5 shows that approximately half of the surface of the tooth flanks of the teeth 13 and 14 is provided with contact regions 17 and 18. In FIG. 6, only about a quarter of the surface of the tooth flanks of the teeth 13 and 14 is provided with contact regions 17 and 18, as a result of which a particularly high saving of material having a lower modulus of elasticity than the material of the remainder of the housing can be achieved. In FIG. 7, on the other hand, three-quarters of the surface of the tooth flanks of the teeth 13 and 14 are provided with contact regions 17 and 18, which provides improved noise reduction relative to the housings shown in FIGS. 5 and 6.

The embodiments of FIG. 5-7 are suitable for producing the contact regions in a method having two steps. For example, the housing is first produced by injection molding from a plastic such as PA, PBT, PE, PP or ABS. The contact regions are then molded onto the housing, for example, by applying the material having a lower modulus of elasticity than the material of the remainder of the housing onto the housing by coating, e.g. by spraying from a nozzle.

The embodiments of FIG. 5-7 are also suitable for producing the material of the actual housing and the material having a lower modulus of elasticity than the material of the remainder of the housing together in a multicomponent injection molding process. This makes it possible to produce a housing according to the invention in a particularly small number of production steps.

A thermoplastic elastomer is preferably used as the material having a lower modulus of elasticity than the material of the remainder of the housing.

Figure 8:
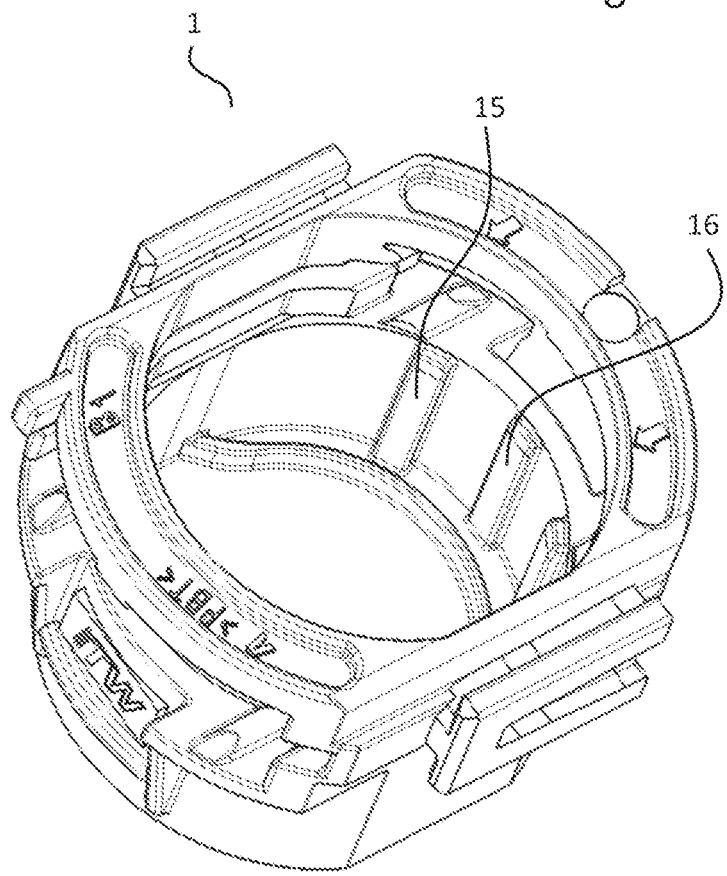
FIG. 8 is another view of a housing of FIG. 4-7.

FIG. 8 shows a housing 1 in which the region opposite to the teeth 13 and 14 is visible. A cylindrical surface, which is still located on the damper, runs on the depicted contact ribs 15 and 16 when the damper is in the freewheeling position.

It can further be provided that the contact region 17, 18 is disposed in a recess of the housing 1 and the dimensions of the recess do not exceed the dimensions of the contact region.

The contact region 17, 18 can be disposed on a flank 10, 11, 13, 14.

The contact region 17, 18 can be disposed on an inner peripheral surface 19 of the housing 1.

According to a method for producing a housing 1 which surrounds a rotation damper 2, it is provided that an additional part 3 having the contact region in which the rotation damper 2 is in contact with the housing is included, whereby the part is made of a material having a lower modulus of elasticity than the housing.

According to a further method for producing a housing, a contact region in which the rotation damper 2 is in contact with the housing 1 can be molded onto an already preformed remainder of the housing, whereby the contact region is made of a material having a lower modulus of elasticity than the remainder of the housing.

Furthermore, by means of a multicomponent injection molding process, by injection molding at least one component to create a housing 1, and by injection molding at least one further component to create a contact region 17, 18 in which the rotation damper is in contact with the housing, whereby the at least one further component is made of a material having a lower modulus of elasticity than the material of the remainder of the housing.

A thermoplastic elastomer can be used as the material having a lower modulus of elasticity than the housing.

LIST OF REFERENCE SIGNS

1 Housing
2 Rotation damper
3 Additional part
4, 5 Flange
6 Inner chamber
7 Groove (groove-shaped depression)
8 Toothing
9 Widening
10, 11 Engaging flank
12 Toothed portion
13, 14 Tooth
17, 18 15, 16 Contact region
19 Inner peripheral surface of the housing
20 Pinion
21 Support element

What is claimed is:

1. A housing of a linear damper which forms a guide for a rotation damper, the housing including:
at least one engagement element, wherein the at least one engagement element is elongated such that a longitudinal extension of the engagement element extends parallel to an axial direction of a rotational movement of the rotation damper, wherein the rotation damper is provided with an outer structure which forms a counter engagement element that is configured to correspond to the engagement element, and
wherein a contact region of the at least one engagement element, in which the counter engagement element of the rotation damper is in contact with the engagement element of the housing during movement in a direction of movement, is made at least in sections of a material having a lower modulus of elasticity than the housing;
wherein the engagement element is formed by multiple teeth and the counter engagement element is formed by a plurality of teeth disposed around a periphery of the rotation damper such that individual teeth of the rotation damper engage with the teeth of the engagement element.

2. The housing according to claim 1, wherein
the material having a lower modulus of elasticity than the housing is a covering of the contact region and has a thickness of about 0.1 mm to 0.6 mm.

3. The housing according to claim 1, wherein
the housing is formed from at least one first component and the contact region is formed from at least one second component having a lower modulus of elasticity than the at least one first component.

4. The housing according to claim 1, wherein
the contact region is disposed on a flank and/or on an inner peripheral surface of the housing.

5. The housing according to claim 4, wherein
the contact region covers three quarters or half or a quarter of the inner peripheral surface of the housing and/or a flank in axial direction.

6. The housing according to claim 1, wherein
the material having a lower modulus of elasticity than the material of the housing is a thermoplastic elastomer.

7. A method for producing a housing which surrounds a rotation damper,
wherein the method is carried out using a multicomponent injection molding process,
by injection molding at least one component to create a housing structure of a first material, and
by injection molding at least one further component onto the housing structure to create a contact region on the housing structure, the contact region being of a second material that has a lower modulus of elasticity than the first material, the contact region located in a position in which the rotation damper is in contact with the housing, the contact region being formed by multiple teeth that are elongated in a direction that is parallel to a rotation axis of the rotation damper;
wherein the second material is a thermoplastic elastomer.

8. The method of claim 7, further comprising
including an additional part comprising the contact region, wherein said additional part is made of a material having a lower modulus of elasticity than the first material.

* * * * *